Patented June 22, 1943

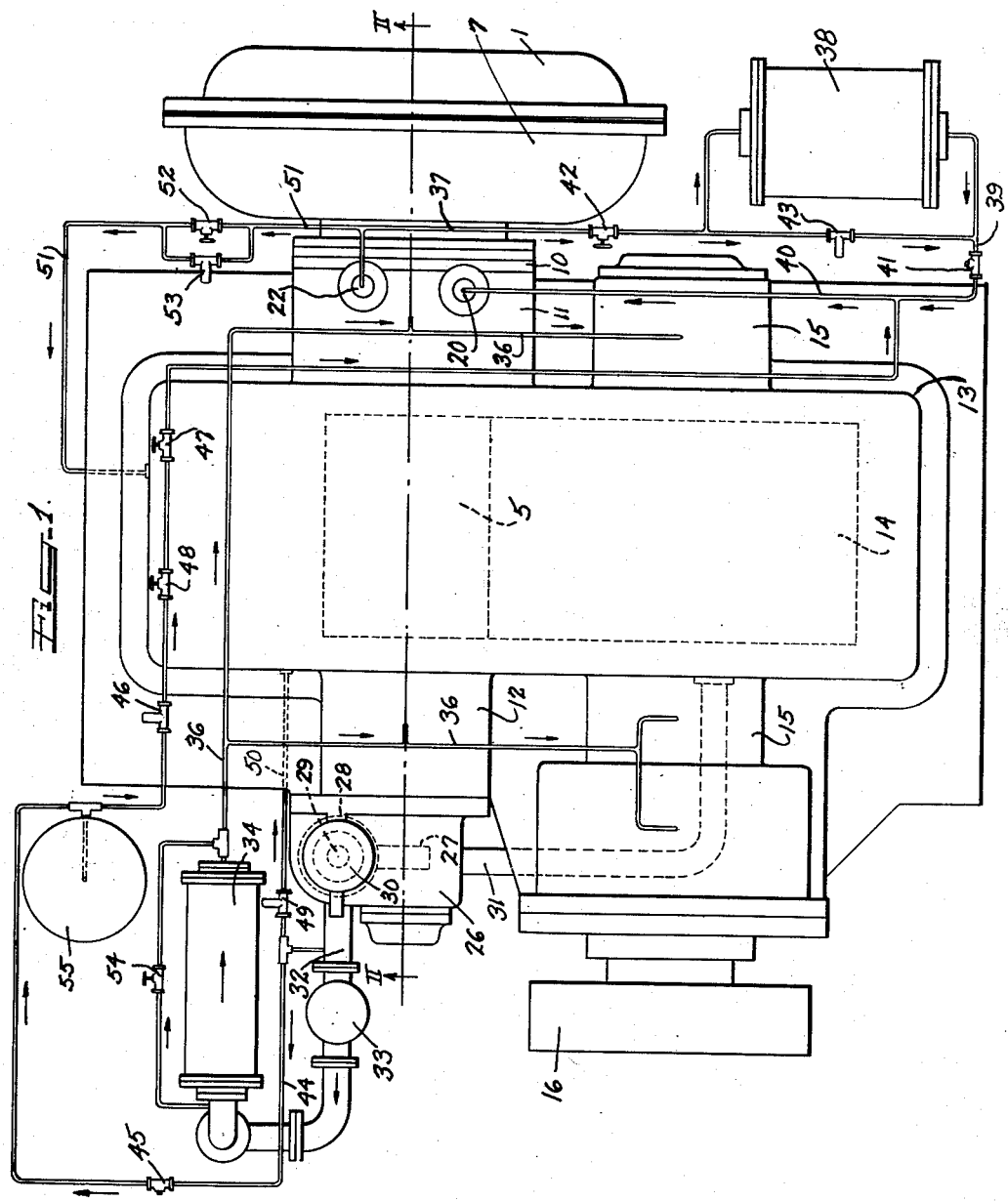

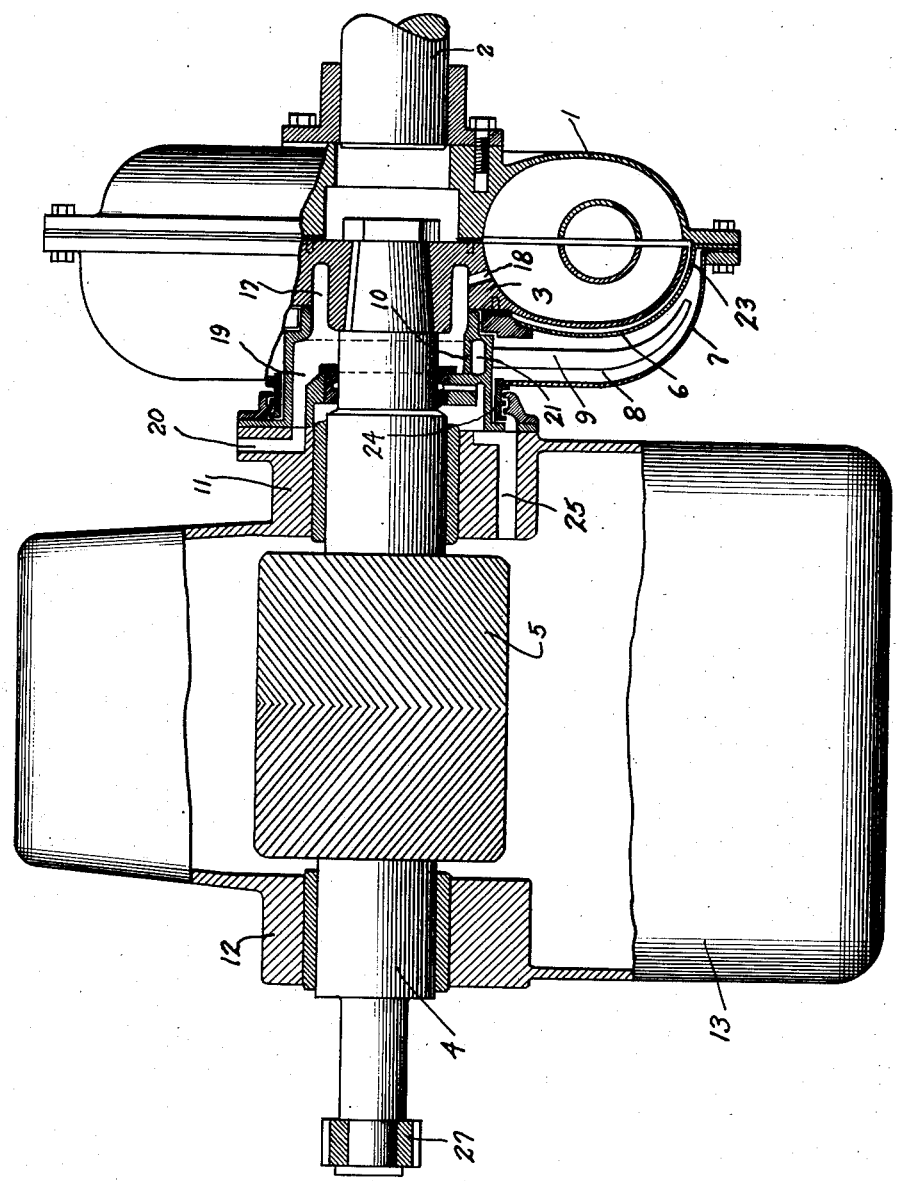

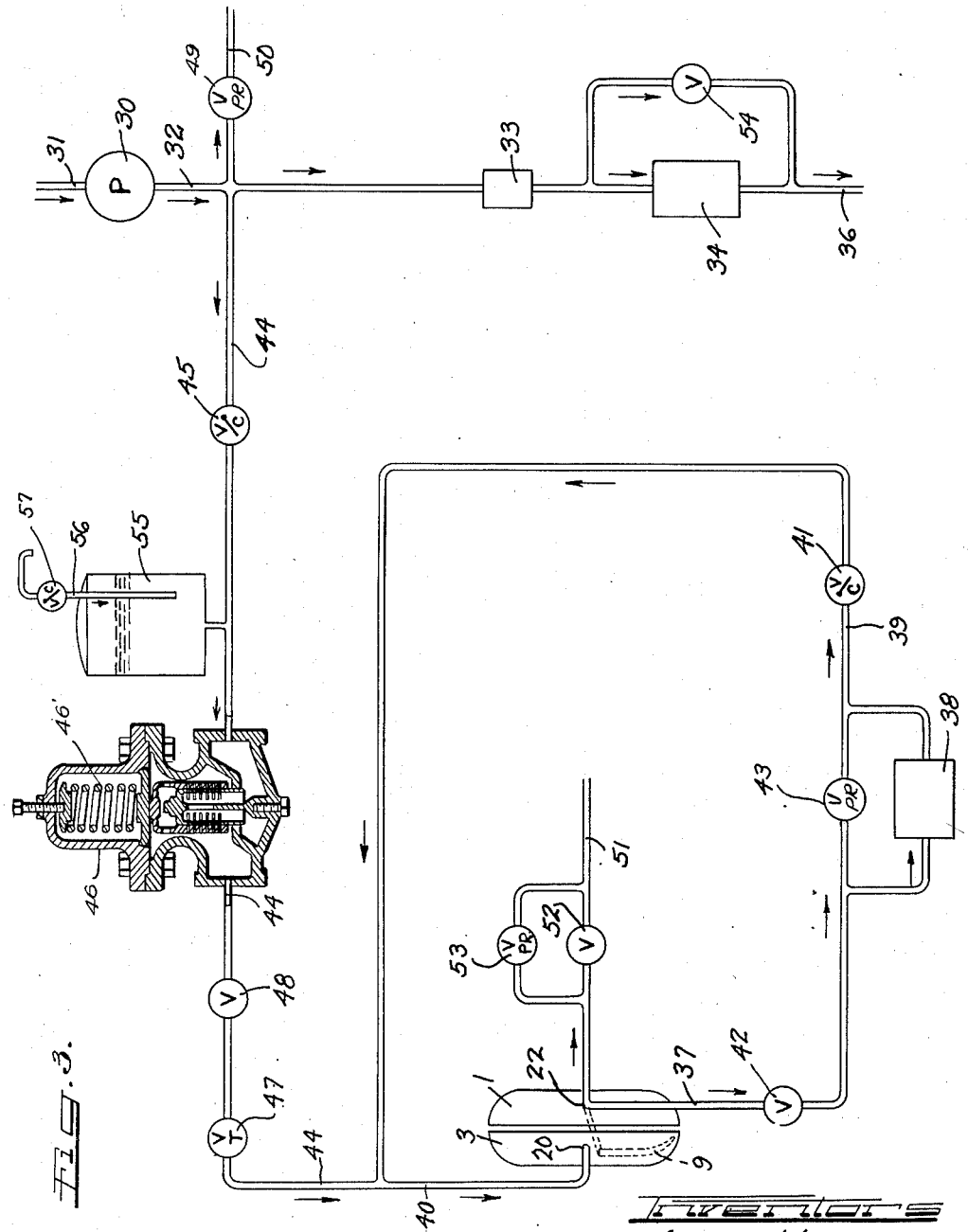

2,322,577

UNITED STATES PATENT OFFICE 2,322,577

HYDRAULIC CLUTCH STRUCTURE

Austin Kuhns and Emil R. Gasser, Buffalo, N. Y., assignors to Farrel-Birmingham Company, Incorporated, Buffalo, N. Y., a corporation of Connecticut Application October 12, 1940, Serial No. 360,878

2 Claims. (Cl. 60—54)

Our invention relates to improved arrangement and operation for hydraulic couplings or clutches such as are used in power systems to transmit drive from a driving source to reduction gearing for driving ship propellers.

An important object of the invention is to provide an arrangement in which a single attached pump, driven by the coupling runner element, will serve to deliver lubricating oil to the various bearing surfaces of a power driving assembly and will also function under suitable valve control to keep the coupling fully supplied with oil.

Another object is to provide an improved arrangement of a stationary scoop tube in the coupling for maintaining circulation of the working fluid in the clutch and for directing the fluid through a cooling circuit discharging back directly into the coupling inlet and to the pump working chambers.

A further object is to provide improved arrangement of manual and automatic control valves and devices for the various oil circuits.

A further object is to provide an arrangement in which, under normal conditions, the attached pump will be fully capable of furnishing adequate oil supply to the coupling, but under certain conditions, the pump may be supplemented by a gravity tank discharging into the pump circuit so that under such conditions the coupling will be properly served.

The various features of our invention are embodied in the structure shown on the drawings, on which drawings:

Figure 1 is a plan view more or less diagrammatic of the clutch structure and means driven thereby, and the various oil flow controlling devices and circuits;

Figure 2 is an enlarged section on plane II—II of Figure 1; and

Figure 3 is a diagrammatic layout showing the clutch, the various pipe circuits, and the flow controlling and regulating devices.

We have shown the hydraulic clutch applied to a reduction gearing such as may be used in marine craft for operating the propellers. Referring to Figure 2, the clutch or coupling comprises the impeller element 1 secured to a shaft 2 which may be driven by a power unit such as a Diesel engine or electric motor, and the runner element 3 mounted on the end of a shaft 4 which carries a driving pinion 5. The cover or inner casing 6 is bolted to and turns with the impeller and encloses the back of the runner. An outer casing 7 is also bolted to the impeller and with the inner casing 6 provides the scoop tube chamber 8 into which the scoop tube 9 extends downwardly from the stationary structure 10 which surrounds the shaft 4 and is carried by the main bearing structure 11 for the shaft, the other end of the shaft being supported in the bearing structure 12, the bearing structures 11 and 12 being provided on the casing 13 which surrounds the driving pinion 5 and the gear 14 (Figure 1) driven by the pinion. The shaft for the gear 14 is journalled in bearing structures 15 also provided by the casing 13, and the end of the shaft terminates in a coupling member 16 by which it may be coupled to the shaft of the member to be driven, as for example a marine propeller.

The supporting hub of the runner element has an annular space 17 connected by inlet ports 18 with the working chambers of the coupling, and this space communicates with the annular space 19 in the frame 10, these spaces forming an inlet chamber to which leads the inlet passage 20 in the bearing structure 11. The scoop tube 9 connects with the annular space 21 which is in communication with the outlet passageway 22 in the bearing structure 11 (Figure 1).

Through the leak-off nozzles 23 oil will flow from the working circuit into the scoop chamber 8 where it is picked up by the scoop, during running of the coupling, for delivery to the outlet 22, the level of the oil in the scoop tube chamber, when the coupling is rotating, being normally just up to the tip of the scoop tube regardless of the quantity of oil in the coupling. The gear casing 13 will serve as a reservoir, and when the coupling is stopped oil may overflow from the scoop chamber 8 into this reservoir by way of the clearance space 24 between the frame 10 and the outer casing 7, and the passageway 25 through the bearing structure 11.

Surrounding the end of the pinion shaft 4 is a gear casing 26 for driving gear 27 on the shaft and a driven gear 28 on the driving shaft 29 for a pump 30, the inlet of this pump being connected by a pipe 31 with the bottom of the casing 13 which forms the oil reservoir. The usual service performed by this pump is the delivery of lubricating oil to the various bearings of the driving assembly. Before delivery of the oil to the bearings, the oil from the outlet pipe 32 of the pump is carried through a suitable strainer and cleaner 33 and a cooler 34. The cleaned and cooled oil is delivered and distributed by piping 36 to the bearings of the gearing within the casing 13, the oil returning from these bearings directly to the casing. As shown, an adjusting valve 64 shunts the cooler so that only a desired proportion of the oil will be cooled.

The main function of the scoop tube 9 is to scoop up oil from the chamber 8 for circulation through a cooling circuit and to keep the chamber drained of oil during normal running of the coupling. A pipe 37 extends from the outlet 22 for receiving the scooped up oil which flows through a cooling device 38 to a pipe 39 which connects with the pipe 40 leading to the inlet 20 of the coupling. Back flow through this circuit is prevented by a check valve 41 included in the pipe 39. By means of an adjustable valve 42 in the pipe 37 the amount of flow through this circuit can be controlled so that the desired proportion of oil flowing through the leak-off nozzles into the chamber 8 may be directed through the cooling circuit. A relief valve 43 is preferably included to shunt the cooler 38 so that after a predetermined maximum pressure in this cooling circuit the relief valve, which is normally closed, will be opened by the pressure for additional flow until the pressure is sufficiently reduced, the valve then again automatically closing.

As has been explained, the pump 30 operates to deliver oil from the reservoir to the various bearings for lubrication thereof. In accordance with our invention this pump will also function to replenish the hydraulic coupling to maintain the desired volume of oil therein. A bleeder pipe 44 extends from the pump to the pipe 40 which leads to the coupling inlet 20. A check valve 45 in the pipe 44 prevents flow from the coupling to the pump.

Included in the pipe 44 is a pressure regulating valve 46, which may be of the type shown in Patent No. 1,938,943 issued December 12, 1933. This valve serves the purpose of definitely limiting the pressure in the clutch while the clutch is operating. When the clutch is filled and creates back pressure in the line 44, this pressure will close the valve as soon as the valve spring 46′, which tends to hold the valve open, is overcome, and while this clutch pressure is maintained the valve will remain closed against flow from the pump 30 to the clutch. The spring pressure is adjustable so that the valve may be set for any pressure limit for the clutch, so long as the set pressure is below the pump supply pressure. Should the clutch pressure drop below the set pressure, then the spring will open the valve for replenishing flow from the pump to the clutch until the pressure is restored and the valve reclosed thereby.

Under certain conditions it may be desirable to cut off the pump circuit entirely from the coupling, and for this purpose a shut-off valve 48 may be included in the pipe 44, preferably between the pressure regulating valve 46 and the coupling.

To protect the oil system against undue pressure from the pump 30, the pump outlet pipe 32 is connected through a relief valve 49 and pipe 50 directly with the reservoir in the gear casing 13.

Under certain conditions it may be desirable to entirely empty the coupling. For this purpose a pipe 51 extends from the coupling outlet 22 to the oil reservoir in the casing 13 and includes a dump valve 52 which is preferably shunted by a pressure relief valve 53. Emptying of the coupling would be accomplished while it is being driven, and the valve 52 is opened and the valve 42 is closed to shut off the cooling circuit and the shut-off valve 48 is closed to disconnect the pump circuit from the coupling. The scoop tube 9 will now be effective to discharge all of the oil from the coupling into the reservoir, and as the oil is drained from the coupling the runner element finally comes to rest. Such complete drainage of the coupling for driving disconnection thereof from the reduction gearing has been the usual procedure, and in order to supply oil to the coupling for driving operation thereof it was necessary to employ a separately driven pump. An important object of our invention is to eliminate such separately driven pump and complete draining of the coupling in case the reduction gearing is to be stopped. We find it to be more practical and desirable to shut down the coupling driving engine and in turn allow the gear set to come to a stop. Under these conditions oil will drain by gravity from the coupling into the gear case reservoir down to the level of the drain passageways 24 and 25 below the bearing structure 11 to leave the coupling approximately one-third full. Now, when the engine is started up, this coupling with one-third of its oil capacity intact will start the reduction gearing, and the attached pump 30, driven by the gearing, will be operated. As the coupling pressure is below normal, the pressure regulating valve 46 will be open and the pump will charge oil from the pipe 32 and along the bleeder pipe 44 into the coupling until the coupling becomes completely filled, the valve 46 then closing. Thereafter the valve 46 will function under control by the coupling pressure for replenishment of oil to the coupling to maintain the desired normal coupling pressure. During operation of the coupling, the oil driven through the cooling circuit by the scoop tube will maintain the desired temperature within the coupling.

For operation of the clutch under partial filling, a throttle valve 47 may be included in the line 44 between the valve 46 and the clutch. The oil in the clutch is reduced to the desired level by opening of the valve 52 for draining of oil from the clutch through the scoop. Then the valve 52 is adjusted to permit a certain amount of the scooped up oil to escape from the clutch into the gear case and the throttle valve is adjusted so that the the level in the clutch is maintained constant. When thus operating the clutch under partial filling, the slip between the driving and driven members becomes larger than normal and at the same time the torque capacity for a given driving speed will be reduced. By regulating the clutch by the throttle valve, the speed of the output shaft may be varied without varying the speed of the input shaft. For each partial filling there is a corresponding torque capacity. During operation under throttle valve control, the valve 46 will remain open for flow from the pump to the clutch under control of the throttle valve. To bring the clutch back to normal full pressure and torque, the valve 52 is closed and the throttle valve opened wide, and the valve 46 then assumes control for filling the clutch and to limit the clutch pressure in accordance with the valve setting.

The relief valve 53 shunting the dump valve 52 serves to limit the pressure in the scoop tube circuit during full pressure operation of the clutch and opens under abnormal pressure to bleed this circuit to the gear case reservoir so that the scoop will be able to keep the scoop chamber 8 emptied. Under all conditions of operation of the clutch, whether under full pressure or partial fill, the scoop tube circuit maintains proper circulation of the clutch working fluid; and also effects cooling of the fluid.

In some installations it may be desirable to employ an oil tank in addition to the pump 30. We have shown a tank 55 for holding a supply of oil and connected to feed this oil under gravity or pressure to the pump line between the check valve 45 and the pressure regulating valve 46. The tank is normally closed and a vent tube 56 is applied in which is included the check valve 57 for preventing the outflow of oil through the vent from the tank. During operation of the clutch oil will be forced under pump pressure into the tank compressing the air therein and this oil under pressure will be available for clutch servicing. If the clutch has been entirely emptied and is to be restarted, oil will be supplied from the tank to the clutch by pressure and gravity until the pump 30 again becomes effective, and then when normal operation is resumed, the tank is again loaded by the pump. To insure a full supply of oil in the tank for refill of the clutch, the shut-off valve 48 is closed before the emptying operation through the scoop tube circuit 51 to the gear case reservoir. When the clutch is shut down by stopping of the driving engine and part of the oil drains therefrom through the passageways 24, 25 into the gear case, then, when the engine starts and valve 48 is opened, the loaded tank will supply oil for refilling of the clutch until the pump 30 reaches its normal pressure operation.

We have shown a practical and efficient embodiment of the features of our invention but we do not desire to be limited to the exact arrangement and operation shown and described as changes and modifications may be made without departing from the scope of the invention.

We claim as follows:

1. A power transmission assembly comprising a hydraulic coupling having an impeller element for connection with a driving source, a runner element, reduction gearing in driven connection with said runner element, bearings for said reduction gearing, an oil reservoir, a pump in driven connection with said runner element and having an inlet in fluid communication with said reservoir, a discharge line connected for lubrication of said bearings, said pump having an outlet connected to said discharge line to lubricate said bearings, means independent of the pump outlet oil pressure to automatically divert oil normally flowing to said bearings at the starting of said coupling to fill said coupling and responsive to a predetermined coupling oil pressure to restore normal flow of oil to the bearings, said means comprising a branch line connecting said discharge line with said coupling, and valve means inserted in said branch line including means independent of pump pressure constantly acting to open said valve and responsive to a predetermined pressure in said coupling to close said valve.

2. A power transmission assembly comprising a hydraulic coupling having an impeller element and a runner element, reduction gearing in driven connection with said runner element, bearings for said gearing, an oil reservoir, a pump in driven connection with said runner element and having an inlet in fluid communication with said reservoir, a discharge line connected for lubrication of said bearings, said pump having an outlet connected to said line to lubricate said bearings, and means independent of the pump outlet oil pressure to automatically divert oil normally flowing to said bearings at the starting of said coupling to fill said coupling and responsive to a predetermined coupling oil pressure to restore normal flow of oil to the bearings, said means comprising a bleeder line connecting said discharge line with said coupling, valve means in said bleeder line, means independent of pump oil pressure constantly acting to automatically open said valve, and means responsive to a predetermined coupling oil pressure connected to automatically close said valve.

AUSTIN KUHNS.
EMIL R. GASSER.